United States Patent [19]

Ivester

[11] 3,996,595
[45] Dec. 7, 1976

[54] PHOTOGRAPHIC APPARATUS WITH EXTENDABLE LIGHT TIGHT IMBIBING MEANS

[75] Inventor: Andrew S. Ivester, Charlestown, Mass.

[73] Assignee: Polaroid Corporation, Cambridge, Mass.

[22] Filed: Apr. 21, 1975

[21] Appl. No.: 569,761

Related U.S. Application Data

[63] Continuation-in-part of Ser. No. 466,371, May 2, 1974.

[52] U.S. Cl. .............................. 354/83; 354/277; 354/288; 354/315; 354/339
[51] Int. Cl.² ...................................... G03B 17/00
[58] Field of Search ............... 354/83, 84, 85, 86, 354/174, 202, 212, 275, 276, 277, 281, 282, 283, 288, 301, 303, 304, 305, 315, 339, 340

[56] References Cited

UNITED STATES PATENTS

| | | | |
|---|---|---|---|
| 2,451,820 | 10/1948 | Garrett | 354/86 |
| 2,496,630 | 2/1950 | Land | 354/84 X |
| 2,873,658 | 2/1959 | Land | 354/83 X |
| 3,748,990 | 7/1973 | Erlichman | 354/186 |
| 3,757,657 | 9/1973 | Eloranta et al. | 354/86 |
| 3,896,469 | 7/1975 | Mather | 354/86 X |

*Primary Examiner*—Joseph F. Peters, Jr.
*Attorney, Agent, or Firm*—Edward S. Roman

[57] ABSTRACT

Photographic camera apparatus for processing exposed film units of the self-developing transparency type including two superposed resilient coiled opaque sheets adjacent the opening thru which exposed film units are advanced from the camera. The sheets are bonded in light tight relation along two opposed edges thereof such that an exposed film unit advancing from the photographic apparatus through the exit opening intervenes between the superpoed sheets. The advancing film unit thereafter operates to uncoil the coiled sheets so as to remain outside the photographic apparatus in light tight relation with respect to ambient light which might otherwise reach the film unit prior to the period required for its complete development. Once the film unit has been developed, the photographer may grasp the leading edge of the film unit and withdraw it from between the opaque sheets afterwhich the resilient sheets automatically assume their coiled state.

30 Claims, 9 Drawing Figures

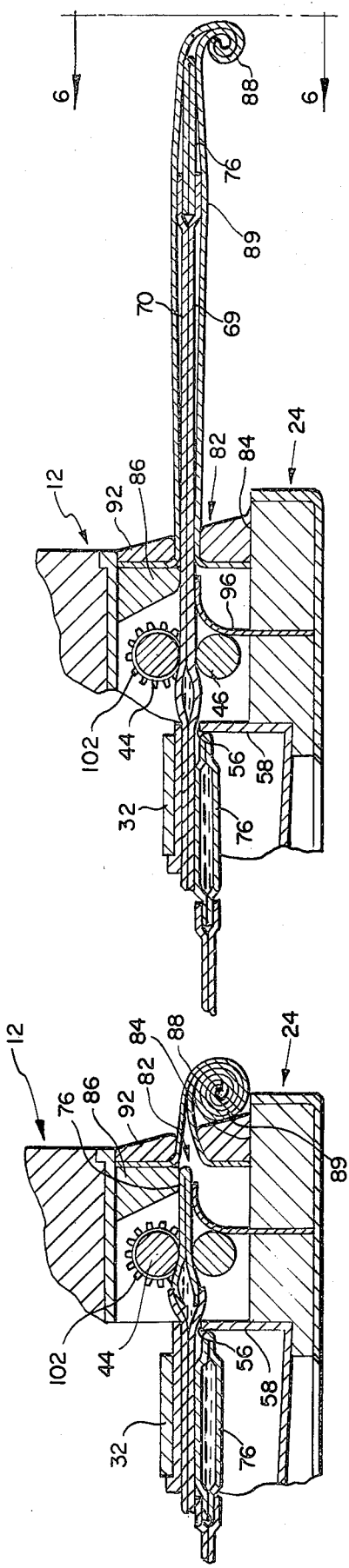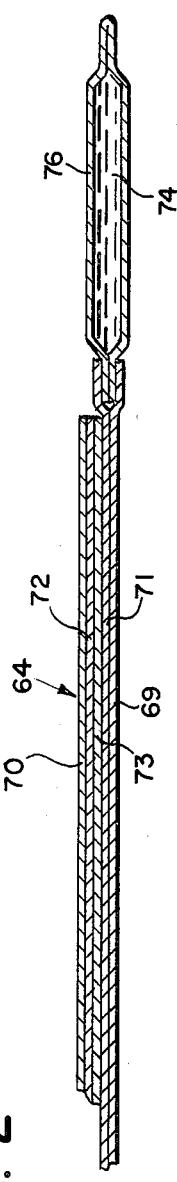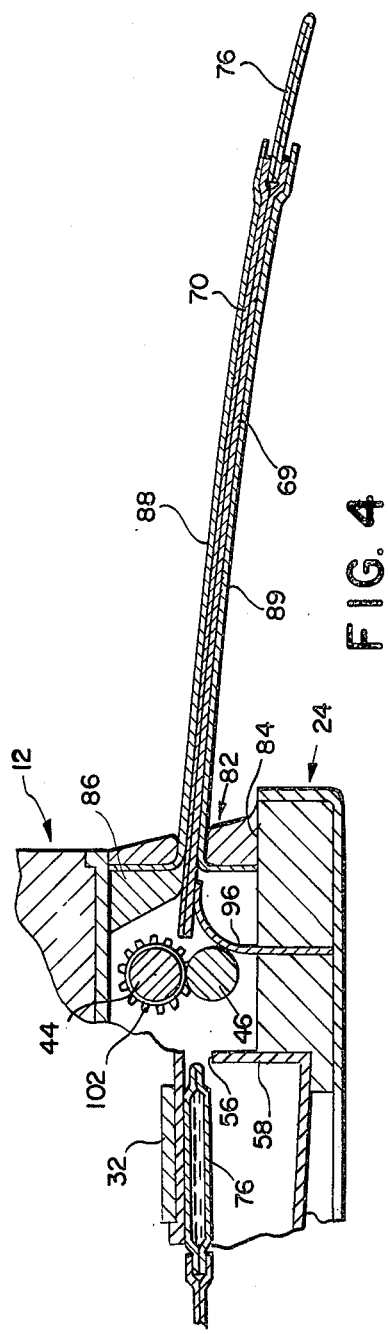

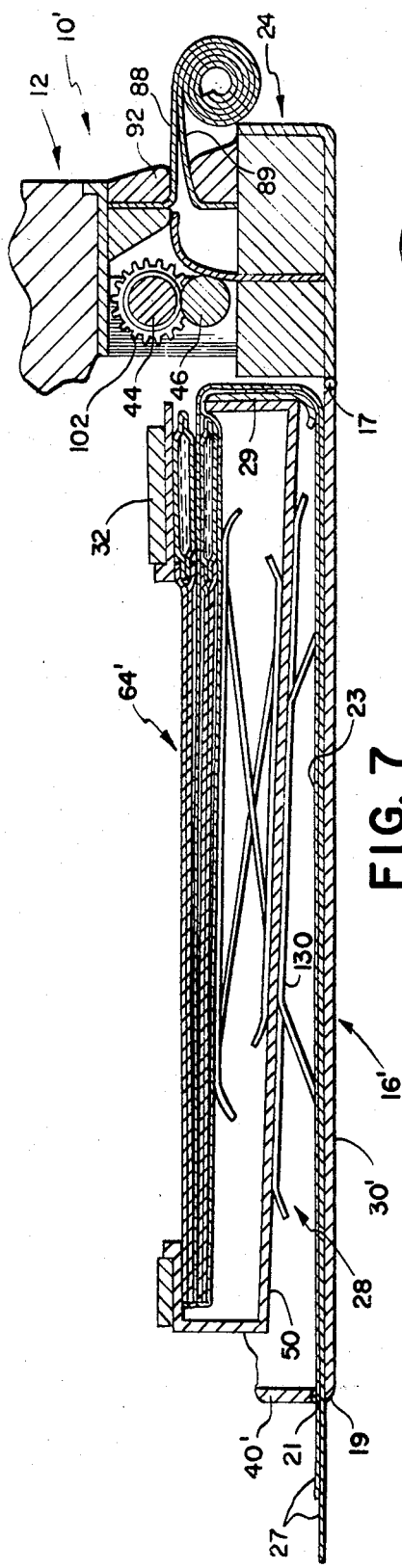
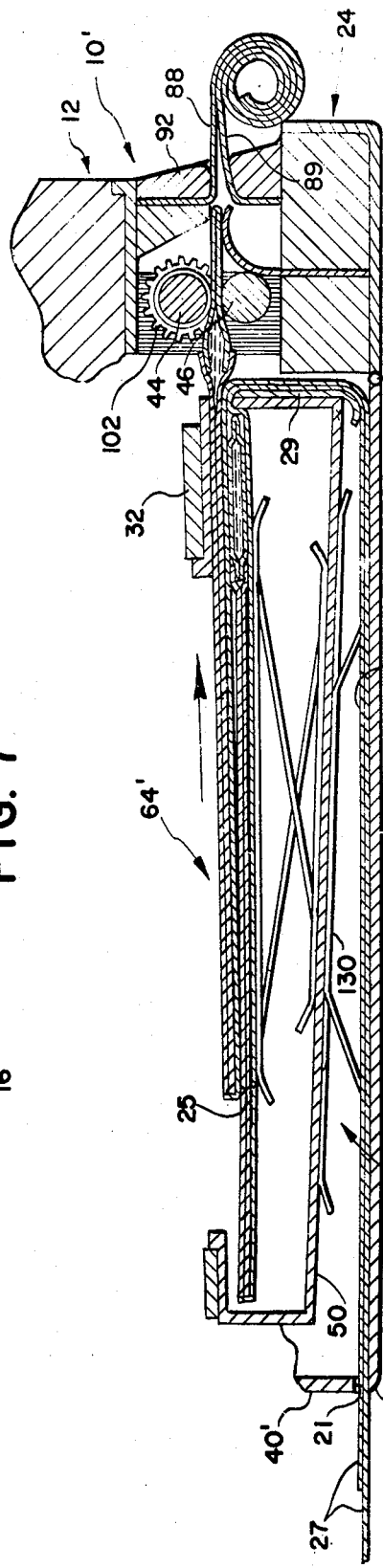
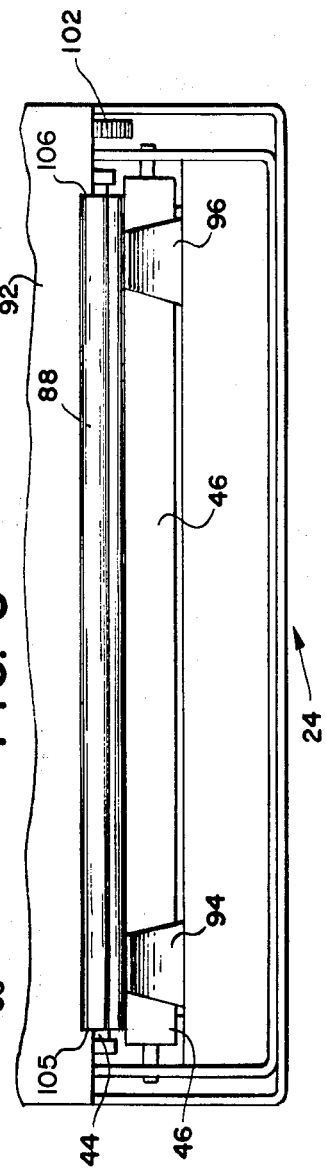

PHOTOGRAPHIC APPARATUS WITH EXTENDABLE LIGHT TIGHT IMBIBING MEANS

REFERENCE TO RELATED APPLICATION

This application is a continuation-in-part of copending application Ser. No. 466,371 filed on May 2, 1974, herewith by A. S. Ivester and entitled *Opaque Shade*.

BACKGROUND OF THE INVENTION

1. Field of the Invention

This invention relates to photographic apparatus of the self-developing type.

2. Description of the Prior Art

Photographic apparatus of the self-developing type are well known and generally comprise, e.g., a camera having a pair of pressure-applying members through which an exposed film unit is advanced while a processing composition is spread across a photosensitive layer of the film unit to initiate formation of a visible image in the film unit. The treated film unit is then advanced to a light tight chamber wherein it remains for a period of time sufficient for a visible image to be substantially formed therein. Examples of cameras of the foregoing type may be found in U.S. Pat. Nos. 2,873,658; 3,396,647; and 3,537,370. Each of these patents patents shows a camera having a chamber for receiving at least a portion of a film unit as it is advanced from between a pair of rollers. The chambers in the first two mentioned patents function to prevent further exposure of a treated film unit to the ambient light while the chamber in U.S. Pat. No. 3,537,370 cooperates with a curtain in the form of a coil of opaque sheet material to prevent further exposure of an untreated film unit. In the latter patent, the leading edge of a film unit is adapted to engage a member on an end of the sheet and uncoil the curtain as they move together past a viewfinder, thereby preventing further exposure of the film unit to light passing through the viewfinder. However, while the foregoing arrangements performed their function well, the chambers added to the overall dimensions of the cameras thereby placing them at an economic disadvantage relative to similar cameras of a more compact design.

Lately, there has been disclosed a family of film units of the self-developing type which can be advanced into the ambient light substantially immediately after the processing composition has been spread across at least a predetermined length of the film unit. One example of this type of film unit is described in U.S. Pat. No. 3,415,644, granted to Edwin H. Land, on Dec. 10, 1968. Film units of this type enhance the compactness of cameras with which they are adapted to be used in that the cameras may be designed to advance a section of the film unit which has been treated with a processing composition from the camera while a section of that film unit yet untreated with the processing composition still remains within the camera.

It has most recently been suggested that compact cameras adapted for use with film units of the above-described type also be utilized with film units of the transparency type. Transparencies generally comprise a positive image superposed on a transparent or translucent support and may be either directly viewed by transmitting light through the transparency to the eye of an observer or indirectly viewed by transmitting light through the transparency for projection on a screen. More specifically, the transparency includes two spaced apart outside layers or elements which are substantially light transparent and may comprise a polyester, such as a polymeric film derived from ethylene glycol terephthalic acid or a cellulose derivative such as cellulose triacetate. Intermediate the outside transparent layers, there is provided a photosensitive silver halide stratum together with an optical screen element or reseau which possesses filter or screen elements for selectively transmitting predetermined portions of the actinic radiation incident to the screen. The transparency would additionally employ an image receiving component intermediate the photosensitive silver halide stratum and the optical screen element as well as a rupturable pod of processing fluid adjacent one edge of the transparency. During exposure operations, image-carrying light rays from the camera's lens pass through one of the transparent outside layers as well as the screen unit and image-receiving component to expose the siler halide stratum. The transparency is subsequently advanced between a pair of spread rollers and towards the film exit means of the camera, whereupon the spread rollers progressively distribute a mass of the processing composition intermediate the silver halide stratum and its adjacent transparent layer. Once the mass of processing composition has been spread, sufficient imbibing time must be allowed in a light tight environment in order to complete the silver diffusion transfer process by which a positive image is formed on the image receiving component. However, as previously discussed, providing a light tight chamber into which the transparency may be advanced during the silver diffusion transfer process would detract from the preferred compact camera design.

Additional problems arise with respect to providing a light tight environment for a transparency in comparison with a photographic print on an opaque base. The opaque base of a photographic print operates to shield one side of the photosensitive layer from premature exposure, and thus it is sufficient to shield only the other side of the photosensitive layer in order to provide a totally light tight environment for processing. However, transparencies do not embody an opaque base portion and thus must be shielded from both sides in order to provide the light tight environment required to complete the diffusion transfer process subsequent to the processing fluid being spread by the spread rollers.

Therefore, it is a primary object of this invention to provide a photographic apparatus which may be utilized to provide transparencies of the self-developed type.

It is further object of this invention to provide a photographic apparatus adapted for use with transparencies of the self-developing type whereby the transparencies may be advanced outside the photographic apparatus and still maintained in a light tight environment for sufficient time to complete the diffusion transfer process.

Other objects of the invention will in part be obvious and will in part appear hereinafter. The invention accordingly comprises the mechanism and system possessing the construction, combination of elements and arrangement of parts which are exemplified in the followed detailed disclosure.

SUMMARY OF THE INVENTION

The present invention relates to photographic apparatus for processing an exposed film unit of the self-developing transparency type having opposed outside major surfaces together with a plurality of superposed substantially transparent layers including a photosensitive layer and a processing composition which is adapted to be spread across the photosensitive layer. The apparatus includes means for supporting the film unit in position for exposure of the photosensitive layer as well as means for advancing the film unit subsequent to exposure away from the exposure position. There are also included means for applying pressure to the film unit subsequent to exposure which pressure applying means include a pair of juxtaposed members between which the exposed film unit is advanced leading edge first during spreading of the processing composition. An exit opening from the photographic apparatus is also provided to accommodate advancement of the film unit to the exterior of the photographic apparatus. Opaque means are mounted adjacent the exit opening for movement with the film unit between a first position wherein the opaque means is in light tight relation with the exit opening and a second position wherein it is in light tight relation with at least the opposed outside major surfaces of the exposed film unit as it passes from the exit opening to the exterior of the photographic apparatus. In this manner, ambient actinic light can be prevented from reaching the film unit prior to the time required for the processing composition to be thoroughly imbibed by the photosensitive layer.

BRIEF DESCRIPTION OF THE DRAWINGS

For a fuller understanding of the nature and objects of the invention, reference should be had to the following detailed description taken in connection with the accompanying drawings wherein:

FIG. 2–4 are fragmental side views, in cross-section, of a portion of the apparatus of FIG. 1 diagrammatically illustrating the relationship between an exposed film unit and the apparatus of the invention as the film unit is advanced to a position outside of the apparatus;

FIG. 5 is a side view in cross-section of a typical film unit;

FIG. 6 is a front elevational view of a portion of the apparatus taken generally along the line 6—6 of FIG. 3;

FIGS. 7 and 8 are fragmental side views in cross-section, of an alternative embodiment of the invention.

DETAILED DESCRIPTION OF THE INVENTION

Figure 1:
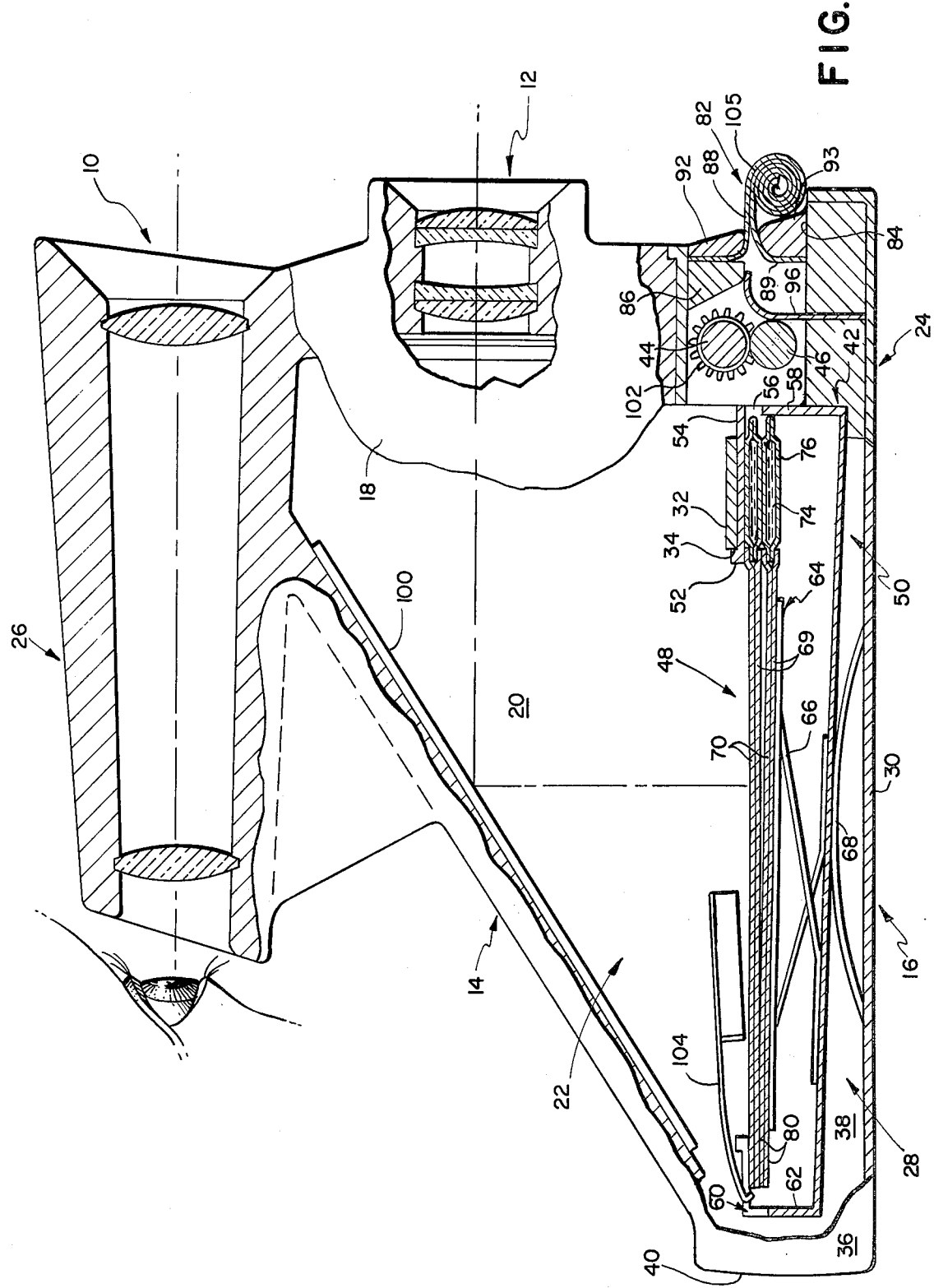
FIG. 1 is a side elevational view, partly in section, of photographic apparatus embodying the instant invention.

Reference is now made to FIG. 1 of the drawings wherein is shown photographic apparatus in the form of a self-developing type camera 10. Camera 10 includes a plurality of housing section 12, 14 and 16 which cooperate with a pair of side walls 18 and 20 to define an exposure chamber 22. Extending forwardly of and pivotally coupled to housing section 16 is a housing 24. Extending upwardly from housing sections 12 and 14 is a conventional viewfinder 26 through which the scene to be photographed may be viewed and/or focused.

Housing section 16 includes an open end chamber 28 defined in part by a bottom wall 30, a platelike member 32 having an exposure aperture 34 therein, side walls 36 and 38 and an end wall 40. Extending across the open end 42 of chamber 38 is a pair of pressure-applying members in the form of rollers 44 and 46. The rollers 44 and 46 are mounted within housing section 24 for movement therewith between the position shown in FIG. 1 and a film loading position wherein housing section 24 has been pivoted clockwise through an angle of approximately ninety degrees to allow a film cassette 48 to be inserted into chamber 28 via opening 42.

The film cassette 48 comprises a container 50 having an exposure opening 52 in a forward wall 54, an elongated opening 56 in leading end wall 58, and a slot 60 in the left-hand portion of forward wall 54 which also extends part way down a trailing end wall 62. Mounted within container 50 are a plurality of transparency type film units 64, a platen 66 for resiliently urging the forwardmost film unit into engagement with forward wall 54, preferably a battery (not shown) for providing the energy to operate various components of the camera as is well known in the art, and a conventional dark slide (not shown). A spring 68 mounted on wall 30 of chamber 28 cooperates with forward wall 32 to located the forwardmost film unit 64 in position for exposure.

The film units 64 are of the transparency type, examples of which are described in U.S. Pat. Nos. 2,861,885; 2,726,154; 2,944,894; 3,536,488; and also U.S. Pat. Nos. 3,615,426; 3,615,427; 3,615,428 and 3,615,429. The film units are diagrammatically illustrated in FIG. 5 as including two outside transparent layers, 69 and 70, between which are provided a photosensitive silver halide stratum 71 together with an optical screen element 72 for selectively transmitting predetermined portions of the actinic radiation incident thereon. The film unit 64 additionally includes an image receiving layer 73 intermediate the photosensitive stratum 71 and optical screen element 72. A processing composition 74 located within a pod 76 attached to the leading edge of the photosensitive stratum 71 is adapted to be spread to initiate formation of a positive image in the image receiving layer 73 of the film unit. The plurality of different layers which make up the film units 64 all transmit light and thus each film unit may be either directly viewed by transmitting light through the transparency to the eye of an observer or indirectly viewed by transmitting light through the transparency for projection on a screen. It should be readily appreciated that the width of each layer or stratum has been greatly exaggerated in FIG. 5 for purposes of illustration, and that those film units 64 shown in the other drawings have been simplified to show only the outside transparent layers 69, 70.

Housing section 24 includes an exit opening 82 defined by spaced members 84 and 86 through which an exposed film unit is adapted to be advanced by rollers 44 and 46. Mounted adjacent exit opening 82 and in light tight relation therewith are a pair of juxtaposed curtain members 88, 89, each of which is preferably formed from a generally rectangular sheet of opaque, resilient polyester material, e.g., Mylar, having a thickness of approximately 0.0015 inch and a width slightly greater than that of the film unit. Curtain members 88, 89 are connected in light tight engagement along their longitudinal edges 105, 106 as shown in FIG. 6. One preferred method it to apply a heat activated adhesive along the corresponding edge portions of the curtain members 88, 89 and thereafter loosely bonding the curtain members 88, 89 in superposition with each other. The superposed curtain members 88, 89 may then be wrapped around a mandrel and heat treated so that their normal unstressed configuration will be that of a coil. The heat treatment also operates to activate the adhesive along the longitudinal edge portions so as to permanently bond the edge portions in light tight engagement. Alternatively, the curtains 88, 89 may be coiled, inserted into a metal tube and then heat treated. Again, as should be readily appreciated, a heat activated adhesive could be used to bond the curtain members 88, 89 along their longitudinal edges. One end 90 of curtain 88 is suitably secured between members 86 and 92 while one end of curtain 89 is suitably secured to member 93, thereby locating the remainder of the curtains in position to be uncoiled by the leading edge of the film unit as it is being advanced to the exterior of the camera. For increased opaqueness, it may be desirable to to metalize the curtains 88, 89 with a thin coating of aluminum which can be applied by any well-known vacuum deposition technique. Also mounted on housing section 24 and extending into engagement with member 86, there may be provided a pair of resilient tabs 94 and 96. It should be readily appreciated that while the curtains 88, 89 are in their coiled positions, they provide an ambient light blocking shield for the exit opening 82 thereby preventing ambient light from reaching the rollers 44, 46.

The operator of the camera initiates an exposure cycle by actuation of a start button or switch (not shown). Actuation of the button results in the forwardmost film unit 64 being exposed via light passing through a lens and shutter assembly 98 and being reflected by a mirror 100 onto the photosensitive layer of the film unit. After the exposure, power is transmitted from the camera's motor to a gear 102 attached at one end to roller 44 to rotate the rollers 44 and 46, and to a film advancing apparatus comprising a film engaging member 104 to actuate the latter in a reciprocating manner so as to engage the trailing edge of the exposed film unit and advance it into engagement with the rotating rollers. The rollers continue to advance the exposed film toward the exterior of the camera via exit opening 82 while simultaneously spreading the processing composition 74 across the photosensitive stratum 71 of the exposed film unit, as shown in FIG. 2. As the leading edge of the exposed film unit leaves the bite of rollers 44 and 46, it first deflects tabs 94 and 96 and then intervenes between curtains 88 and 89 progressively uncoiling them, as shown in FIGS. 2 and 3, so as to prevent ambient light from striking any transparent portion of the film unit 64. In this manner the opposed major surfaces of the film unit 64, as defined by the outside transparent layers 69, 70, are maintained by respective overlapping curtains 88, 89 in light tight relation with respect to ambient actinic light which might otherwise be prematurely transmitted to the photosensitive stratum 71 prior to the processing composition being throughly imbibed. The rollers 44 and 46 continue to advance the exposed film unit until the curtains 88, 89 have been fully uncoiled. At this time the rollers 44 and 46 have substantially completed spreading the processing composition and the trailing edge of the film unit is entering the bite of the rollers. Further advancement of this exposed film unit results in its leading edge moving out from between the curtains 88, 89 at the open end of the curtains as shown in FIG. 4. At substantially this time the trailing edge of the film unit moves out of engagement with the rollers 44 and 46 and the film unit is releasably retained in a light tight condition by the coaction of the curtains 88, 89 until the photosensitive stratum 71 is thoroughly imbibed in the processing composition 74 thereby substantially completing the diffusion transfer process. The photographer may in fact time a minimal period during which the film unit is retained between the curtains 88, 89 after which the photographer can withdraw the film unit between the curtain 88, 89 by grasping the exposed leading edge of the film unit.

Reference is now made to FIGS. 7 and 8 of the drawings wherein is shown another embodiment of the invention. In this embodiment the camera 10' is substantially identical to the camera 10 described in FIGS. 1–6 except for the absence of any film engaging member 104 and for a modified housing section 16'. Housing section 16' includes a rear wall 30' suitably hinged at 17 for counterclockwise rotation to a film cassette loading position. A pair of biasing springs 130 (only one of which is shown) are mounted at opposite lateral sides of wall 30' for urging a film cassette 50 against member 32. One end 19 of wall 30' cooperates with a trailing end wall 40' to provide an aperture 21 through which a leader attached to a film unit may be withdrawn. Each of the film units 64' is substantially identical to the film units 64 previously described except for the addition of a leader 23. Each leader 23 is detachably secured, e.g., by an adhesive, at one end 25 to a respective filament near the trailing end (to the left as viewed in FIGS. 7 and 8) of the film unit. The opposite end 27 of each leader extends around a guide member 29, between biasing springs 130 and through aperture 21 to the exterior of the camera. After the forwardmost film unit 64' has been exposed, the photographer grasps the end 27 of the lowermost leader 23 and pulls it to the left thereby resulting in the exposed film unit being manually advanced into engagement with the rotating rollers 44 and 46. Rollers 44 and 46 continue to advance the exposed film unit to the exterior of the camera as described hereinbefore with reference to the embodiment described in FIGS. 1–6. Leader 23 eventually is detached from the film unit either by being stripped away from the film unit by the opposing forces of the rollers and the photographer or, as is well known in the art, is detached from the film unit when the force being directed along the leader is substantially perpendicular to its point of attachment to the film unit. Although the leader 23 has been described as being releasably secured near the trailing end of the film unit, it should be understood that its point of attachment may be at any point thereon so long as it advances the leading end of the film unit into the bite of the rollers.

Figure 9:
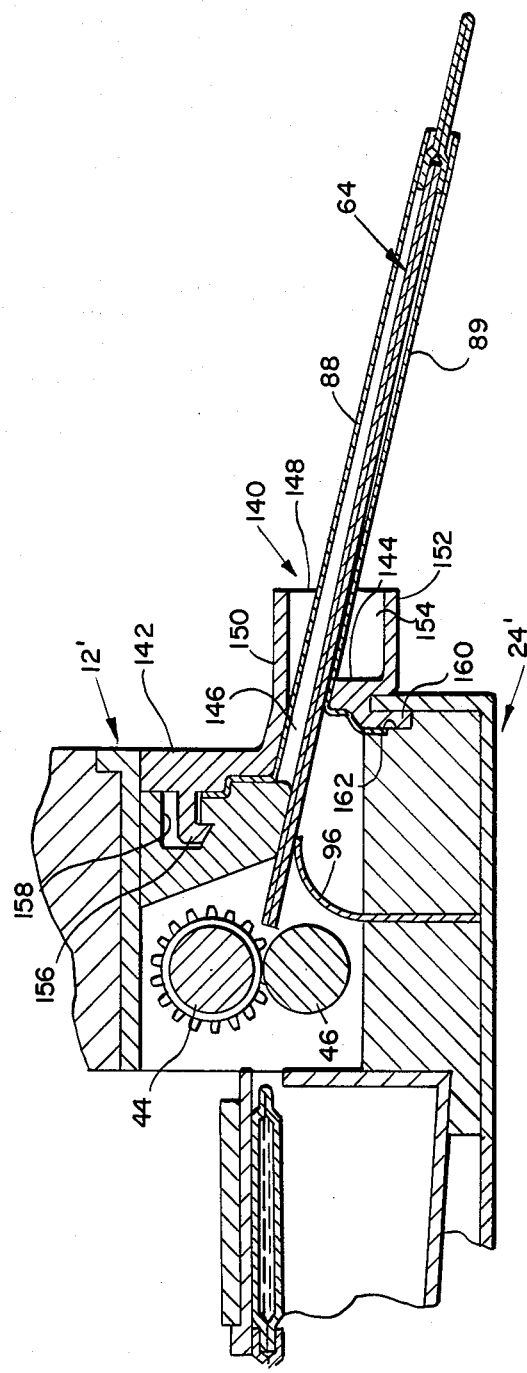
FIG. 9 is a fragmental side view in cross-section of still another alternative embodiment of the invention.

Referring now to FIG. 9, there is shown still another embodiment of the invention whereby the curtains 88, 89 may be releasably connected with respect to the slightly modified housing sections 12' and 14' by means of a detachable curtain frame shown generally at 140. Ready detachment of the curtains 88, 89 is a desirable feature in order to facilitate use in the camera of film units of the non-transparency type which utilize an opaque backing upon which a visible image is formed. The detachable curtain frame 140 comprises two spaced apart longitudinal wall members 142, 144 interconnected at the opposed ends thereof by integral transverse end wall members, only one of which is shown at 148. The longitudinal wall members 142, 144 in cooperation with the transverse wall members define an exit opening 146 through which film units may be advanced into interposition between the curtains 88, 89. As is readily apparent, one end of curtain 88 is suitably secured to wall member 142 while one end of curtain 89 is suitably secured to wall member 144 thereby locating the remainder of the curtains in position to be uncoiled by the leading edge of the film unit 5 as it is advanced through the exit opening 146.

The longitudinal wall member 142 includes a plurality of spaced apart resilient tang members 156 extending laterally outward therefrom in a manner readily accommodating their insertion into corresponding spaced apart receiving holes in the housing section 12'. Wall member 144 includes a key extension 160 projecting outward therefrom for receipt by a key hole 162 in the housing section 24'. The frame 140 may thus be attached to the housing sections 12', 24' by first aligning the key extension 160 for insertion within the key hole 162 and thereafter rotating the frame 140 in a counterclockwise direction so as to insert the tangs 156 within their respective holes 158, ultimately applying sufficient pressure to the wall member 142 to cause the tangs 156 to snap into releasable locking engagement with the edges of their respective holes 158. Frame 140 may thereafter be removed by prying the wall member 142 and its associated tangs 156 out of engagement with the holes 158 and then rotating the frame 140 in a clockwise direction so as to disengage the key 160 from its associated key hole 162.

A curtain storage chamber is shown at 154 and operates to house the curtains 88, 89 when in their coiled retracted positions. The storage chamber 154 is defined generally by two spaced apart longitudinal flange members 150, 152 projecting laterally outward from respective wall members 142, 144 in cooperation with the transverse end wall members, only one of which is shown at 148.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for processing an exposed film unit of the type having opposed major surfaces and including a pod of processing fluid arranged to release the processing fluid retained therein along a photosensitive layer of the film unit in response to a compressive force being exerted thereagainst, said apparatus comprising:

a housing formed of opaque material, said housing being configured to retain at least one of the exposed film units at a given position and to define an opening through which the film unit may be advanced from said housing;

a pair of elongated juxtaposed members located intermediate said given position within said housing and said opening and arranged to first exert a compressive force on the pod to release the processing fluid retained therein and then to subsequently direct the released processing fluid progressively to the exposed film unit being advanced from its said given position within said housing through said opening; and means for protecting substantially the two major surfaces of the film unit from ambient light rays as the film unit emerges from said housing through said opening, said means including at least one opaque member mounted from said housing in a normally stored position entirely within the confines of said housing; said means being structured and arranged to be automatically progressively extended from the confines of said housing to respectively overlie at least two major surfaces of the film unit as the film unit is advanced a predetermined distance outward of said opening, and to be automatically returned to said stored position within the confines of said housing, in response solely to said film unit being advanced further outwardly of said opening.

2. Photographic apparatus as defined in claim 1 further including means for mounting said one opaque member in the path of travel of the film unit as the film unit moves from between said juxtaposed members through said opening such that the leading edge of the film unit engages said one opaque member to progressively extend said opaque member in respective light tight relation with the opposed outside major surfaces of the film unit.

3. Photographic apparatus as defined in claim 1 wherein said one opaque member extends across said opening in light tight relation therewith when said opaque member is in its said stored position.

4. Photographic apparatus for processing an exposed film unit of the type having opposed major surfaces and including a pod of processing fluid arranged to release the processing fluid retained therein along a photosensitive layer in response to a compressive force being exerted thereagainst, said apparatus comprising:

a housing formed of opaque material, said housing being configured to retain at least one of the exposed film units at a given position and to define an opening through which the film unit may be advanced from said housing;

a pair of elongated juxtaposed members located intermediate said given position within said housing and said opening and arranged to first exert a compressive force on the pod to release the processing fluid retained therein and then to subsequently direct the released processing fluid progressively to the exposed film unit being advanced from its said given position within said housing through said opening; and means for at least substantially protecting two major surfaces of the film unit from ambient light rays as the film unit emerges from said housing through said opening, said means including at least two opaque members mounted from said housing and structured and arranged to be automatically progressively extended from said housing to respectively overlie at least two major surfaces of the film unit as the film unit is advanced a predetermined distance outward of said opening, and to be automatically returned to their unextended position in response solely to said film unit being advanced further outwardly of said opening wherein said opaque members comprise two superposed coils of resilient material connected together in light tight relation along at least a portion of two spaced apart edges with respective opposed nonconnected edges of said coils being secured adjacent respective opposed edges of said opening.

5. Photographic apparatus for processing an exposed film unit of the type having opposed major surfaces and including a pod of processing fluid arranged to release the processing fluid retained therein along a photosensitive layer in response to a compressive force being exerted thereagainst, said apparatus comprising:

a housing formed of opaque material, said housing being configured to retain at least one of the exposed film units at a given position and to define an opening through which the film unit may be advanced from said housing;

a pair of elongated juxtaposed members located intermediate said given position within said housing and said opening and arranged to first exert a compressive force on the pod to release the processing fluid retained therein and then to subsequently direct the released processing fluid progressively to the exposed film unit being advanced from its said given position within said housing through said opening; and means for at least substantially protecting two major surfaces of the film unit as the film unit is advanced a predetermined distance outward of said opening, and to be automatically returned to their unextended position in response solely to said film unit being advanced further outwardly of said opening wherein said opaque members comprise two superposed coils of resilient material and said photographic apparatus housing further defines at least in part means for mounting said coils of resilient material in position to be at least partially uncoiled by the leading edge of the film unit when advanced into interposition with respect to said superposed coils.

6. Photographic apparatus as defined in claim 5 wherein said mounting means includes: a frame comprising two spaced apart elongated wall members interconnected at the opposed ends thereof by transverse end wall members which collectively define said opening through which a film unit may be advanced wherein one end of each coil is secured to a respective elongated wall member adjacent an opposed edge of said frame opening, together with means for releasably securing said mounting means with respect to the remainder of said housing.

7. Photographic apparatus as defined in claim 5 wherein said coils of resilient material comprise a metalized polyester material.

8. Photographic apparatus for processing an exposed film unit of the type having opposed major surfaces and including a pod of processing fluid arranged to release the processing fluid retained therein along a photosensitive layer in response to a compressive force being exerted thereagainst, said apparatus comprising:

a housing formed of opaque material, said housing being configured to retain at least one of the exposed film units at a given position and to define an opening through which the film unit may be advanced from said housing;

a pair of elongated juxtaposed members located intermediate said given position within said housing and said opening and arranged to first exert a compressive force on the pod to release the processing fluid retained therein and then to subsequently direct the released processing fluid progressively to the exposed film unit being advanced from its said given position within said housing through said opening; and means for at least substantially protecting two major surfaces of the film unit from ambient light rays as the film unit emerges from said housing through said opening, said means including at least two opaque members mounted from said housing and structured and arranged to be automatically progressively extended from said housing to respectively overlie at least two major surfaces of the film unit as the film unit is advanced a predetermined distance outward of said opening, and to be automatically returned to their unextended position in response solely to said film unit being advanced further outwardly of said opening wherein said opaque members comprise two superposed sheets of resilient material formed to assume a coiled configuration when in the unextended position and adapted to be uncoiled through a distance substantially corresponding to that which the leading edge of the film unit moves past said opening whereby said opaque members automatically return to said coiled configuration in the unextended position when the film unit is withdrawn from between said sheets of resilient material.

9. Photographic apparatus as defined in claim 8 wherein said pressure-applying means includes at least one roller.

10. Photographic apparatus for processing an exposed film unit of the type having opposed outside major surfaces together with a photosensitive layer and a processing composition which is adapted to be spread across the photosensitive layer comprising:

means for supporting the film unit in position for exposure of the photosensitive layer;

means for applying pressure to the film unit including a pair of juxtaposed members between which the exposed film unit may be advanced leading edge first to effect the spreading of the processing composition across the photosensitive layer after exposure thereof;

means for defining an exit opening located forwardly of said pressure-applying means through which the film unit may be advanced; and means, including at least one opaque member mounted adjacent said exit opening in a predetermined stored arrangement, said arrangement being insensitive to changes in the orientation of said apparatus, for receiving in light tight relation a film unit advancing from said exit opening, said film receiving means being arranged to progressively extend outwardly from said apparatus from its said stored arrangement adjacent said exit opening as a result of a film unit advancing through said exit opening in order to cover in light tight relation at least the opposed outside major surfaces of the exposed film unit to prevent ambient actinic light from being transmitted to the exposed film unit prior to the time required for the processing composition to be thoroughly imbibed by the photosensitive layer, said film receiving means automatically returning to its said stored arrangement, responsive to the withdrawal of the exposed film unit from said film receiving means.

11. Photographic apparatus as defined in claim 10 further including means for mounting said opaque member in the path of travel of the exposed film unit as the exposed film unit moves from between the pressure-applying means through said exit opening such that the leading edge of the exposed film unit engages said opaque member and progressively extends said opaque member in light tight relation with at least the opposed outside major surfaces of said exposed film unit.

12. Photographic apparatus as defined in claim 10 further including means for mounting said opaque member in light tight relation to said exit opening.

13. Photographic apparatus as defined in claim 12 wherein said opaque member extends across said exit opening a light tight relation therewith when said opaque member is in a nonextended condition.

14. The photographic apparatus of claim 10 wherein said opaque member is coiled in said predetermined stored arrangement.

15. Photographic apparatus for processing an exposed film unit of the type having opposed outside major surfaces together with a photosensitive layer and a processing composition which is adapted to be spread across the photosensitive layer comprising:

means for supporting the film unit in position for exposure of the photosensitive layer;

means for applying pressure to the film unit including a pair of juxtaposed members between which the exposed film unit may be advanced leading edge first during spreading of the processing composition;

means for defining an exit opening located forwardly of said pressure-applying means through which the film unit may be advanced; and opaque means mounted adjacent said exit opening for receiving in light tight relation a film unit advancing from said exit opening, said opaque means being arranged to progressively extend from its position adjacent said exit opening as a direct result of engagement by the leading edge of a film unit advancing through said exit opening in order to cover in light tight relation at least the opposed outside major surfaces of the exposed film unit to prevent ambient actinic light from being transmitted to the exposed film unit prior to the time required for the processing composition to be thoroughly imbibed by the photosensitive layer wherein said opaque means comprises two superposed coils of resilient material connected together in light tight relation along at least respective portions of two spaced apart edges with opposed nonconnected edges of said coils being secured adjacent respective opposed edges of said exit opening.

16. Photographic apparatus for processing an exposed film unit of the type having opposed outside major surfaces together with a photosensitive layer and a processing composition which is adapted to be spread across the photosensitive layer comprising:

means for supporting the film unit in position for exposure of the photosensitive layer;

means for applying pressure to the film unit including a pair of juxtaposed members between which the exposed film unit be advanced leading edge first during spreading of the processing composition;

means for defining an exit opening located forwardly of said pressure-applying means through which the film unit may be advanced; and opaque means mounted adjacent said exit opening for receiving in light tight relation a film unit advancing from said exit opening, said opaque means being arranged to progressively extend from its position adjacent said exit opening as a direct result of engagement by the leading edge of a film unit advancing through said exit opening in order to cover in light tight relation at least the opposed outside major surfaces of the exposed film unit to prevent ambient actinic light from being transmitted to the exposed film unit prior to the time required for the processing composition to be thoroughly imbibed by the photosensitive layer wherein said opaque means comprises two superposed coils of resilient material and said photographic apparatus further includes means for mounting said coils of resilient material in position to be at least partially uncoiled by the leading edge of the exposed film unit when advanced onto interposition with respect to said superposed coils.

17. Photographic apparatus as defined in claim 16 wherein said mounting means includes: a frame comprising two spaced apart elongated wall members interconnected at the opposed ends thereof by transverse end wall members which collectively define an opening through which the exposed film unit may be advanced wherein one end of each coil is secured to a respective elongated wall member adjacent an opposed edge of said frame opening, together with means for releasably securing said mounting means adjacent said exit opening.

18. Photographic apparatus as defined in claim 16 wherein said coils of resilient material comprise a metalized polyester material.

19. Photographic apparatus for processing an exposed film unit of the type having opposed outside major surfaces together with a photosensitive layer and a processing composition which is adapted to be spread across the photosensitive layer comprising:

means for supporting the film unit in position for exposure of the photosensitive layer;

means for applying pressure to the film unit including a pair of juxtaposed members between which the exposed film unit may be advanced leading edge first during spreading of the processing composition;

means for defining an exit opening located forwardly of said pressure-applying means through which the film unit may be advanced; and opaque means mounted adjacent said exit opening for receiving in light tight relation a film unit advancing from said exit opening, said opaque means being arranged to progressively extend from its position adjacent said exit opening as a direct result of engagement by the leading edge of a film unit advancing through said exit opening in order to cover in light tight relation at least the opposed outside major surfaces of the exposed film unit to prevent ambient actinic light from being transmitted to the exposed film unit prior to the time required for the processing composition to be thoroughly imbibed by the photosensitive layer wherein said opaque means comprises two superposed sheets of resilient material formed to assume a coiled configuration when in an unextended position and adapted to be uncoiled through a distance substantially corresponding to that which the leading edge of the film unit moves past said exit opening whereby said opaque means automatically returns to said coiled configuration in the unextended position when the film unit is withdrawn from between said sheets of resilient material.

20. Photographic apparatus as defined in claim 19 wherein said pressure-applying means includes at least one roller.

21. Photographic apparatus for processing an exposed film unit of the type having opposed outside major surfaces together with a photosensitive layer and a nonphotosensitive margin, and a processing composition which is adapted to be spread across the photosensitive layer comprising:

a housing formed of opaque material and configured to retain at least one of the exposed film units at a given position and to define an opening through which the film unit may be advanced from said housing;

means within said housing for applying pressure to the exposed film unit as it is advanced from its said position within said housing outwardly of said housing through said opening, said pressure applying means including a pair of juxtaposed members between which the exposed film unit may be advanced leading edge first during spreading of the processing composition; and means including at least one opaque member mounted adjacent said exit opening in a predetermined stored arrangement, said arrangement being insensitive to changes in the orientation of said apparatus, for receiving in light tight relation an exposed film unit advancing from said opening, said film receiving means being configured for movement with the film unit between a first position wherein said receiving means is in light tight relation with said housing opening and a second position wherein it is in light tight relation with at least the photosensitive portion of the opposed outside major surfaces of the exposed film unit as it passes from said housing opening to the exterior of said housing, said film receiving means additionally defining an exit opening through which a portion of said nonphotosensitive margin extends immediately upon the trailing edge of the film advancing from the juxtaposed members thereby accommodating the gripping of the film unit so that the film unit may be manually advanced to the exterior of said receiving means.

22. Photographic apparatus for processing an exposed film unit of the type having opposed outside major surfaces together with a photosensitive layer, and a processing composition which is adapted to be spread across the photosensitive layer comprising:

a housing formed of opaque material and configured to retain at least one of the exposed film units at given position and to define an opening through which the film unit may be advanced from said housing;

means within said housing for applying pressure to the exposed film unit as it is advanced from its said position within said housing through said opening, said pressure applying means including a pair of juxtaposed members between which the exposed film unit may be advanced leading edge first during spreading of the processing composition; and opaque means mounted adjacent said exit opening for receiving in light tight relation an exposed film unit advancing from said opening, said opaque means being configured for movement with the film unit between a first position wherein said opaque means is in light tight relation with said housing opening and a second position wherein it is in light tight relation with at least the opposed outside major surfaces of the exposed film unit as it passes from said housing opening to the exterior of said housing, said opaque means additionally defining an exit opening through which the film unit may be advanced to the exterior of the photographic apparatus;

wherein said opaque means comprises two superposed sheets of opaque material connected together in light tight relation along at least respective portions of two spaced apart edges and adapted to assume a coiled configuration when in said first position and a substantially flat configuration when in said second position.

23. Photographic apparatus as defined in claim 22 wherein said sheets of opaque material are metalized and include a resilient property for automatically returning said opaque sheets to said coiled configuration when in an unstressed condition.

24. Photographic apparatus as defined in claim 22 wherein said opaque sheets are mounted in position to be uncoiled by the leading edge of the film unit as it passes from said housing opening past two opposed non-connected edge portions of said opaque sheets into interposed relation between said opaque sheets, said opaque means exit opening being defined by the two other opposed non-connected edge portions of said opaque sheets.

25. Photographic apparatus as defined in claim 24 wherein said opaque sheets are adapted to be uncoiled through a distance by the leading edge of the film unit, said distance substantially corresponding to the length of the film unit whereby said opaque sheets automatically return to said first position after the film unit is withdrawn from between said opaque sheets through said opaque means exit opening.

26. An imbibing assembly for use with photographic apparatus of the type used for processing an exposed film unit having opposed outside major surfaces together with a photosensitive layer and a processing composition adapted to be spread across the photosensitive layer wherein the photographic apparatus includes means for applying pressure to the exposed film unit and a housing configured to retain at least one of the exposed film units at a given position and to define an exit opening located forwardly of the pressure applying means through which the film unit may be advanced from the housing, said imbibing assembly comprising:

means for at least substantially protecting two major surfaces of the film unit from ambient light rays as the film unit emerges from the housing through the opening, said means including at least two opaque members structured and arranged to be automatically progressively extended from the housing to respectively overlie at least two major surfaces of the film unit as the film unit is advanced a predetermined distance outward of the opening and to be automatically returned to the unextended position in response solely to the film unit being advanced from said opaque members, and means for accommodating the reasonable mounting of said opaque means to the housing in the path of travel of the exposed film unit as the exposed film unit moves through the exit opening wherein said opaque members comprise two superposed coils of resilient material connected together in light tight relation along at least a portion of two spaced apart edges with respective opposed non-connected edges of said coils being secured to said mounting means and wherein said mounting means accomodates mounting said coils of resilient material in position to be at least partially uncoiled by the leading edge of the film unit when advanced into interposition with respect to said superposed coils.

27. The imbibing assembly of claim 26 wherein said mounting means includes a frame comprising two spaced apart elongated wall members interconnected at the opposed ends thereof by transverse end wall members which collectively define an opening through which a film unit may be advanced wherein one end of each coil is secured to a respective elongated wall member adjacent an opposed edge of said frame opening.

28. An imbibing assembly for use with photographic apparatus of the type used for processing an exposed film unit having opposed outside major surfaces together with a photosensitive layer and a processing composition adapted to be spread across the photosensitive layer wherein the photographic apparatus includes means for applying pressure to the exposed film unit and means for defining an exit opening located forwardly of the pressure-applying means through which the film unit may be advanced, said imbibing assembly comprising:
- opaque means arranged to progressively extend as the result of engagement by the leading edge of a film unit advancing through said exit opening for covering in light tight relation at least the opposed outside major surfaces of the exposed film unit to prevent ambient light from being transmitted to the exposed film unit prior to the time required for the processing composition to be thoroughly imbibed by the photosensitive layer; and
- means for accommodating the releasable mounting of opaque means in the path of travel of the exposed film unit as the exposed film unit moves through the exit opening such that the leading edge of the exposed film unit engages said opaque means and progressively extends said opaque means in light tight relation with at least the opposed outside major surfaces of the exposed film unit
- wherein said opaque means comprise two superposed coils of resilient material connected together in light tight relation along at least a portion of two spaced apart edges with respective opposed non-connected edges of said coils being secured to said mounting means and wherein said mounting means accommodates mounting said coils of resilient material in position to be at least partially uncoiled by the leading edge of the film unit when advanced into interposition with respect to said susperposed coils.

29. The imbibing assembly of claim 28 wherein said mounting means includes a frame comprising two spaced apart elongated wall members interconnected at the opposed ends thereof by transverse end wall members which collectively define an opening through which a film unit may be advanced wherein one end of each coil is secured to a respective elongated wall member adjacent an opposed edge of said frame opening.

30. An imbibing assembly for use with photographic apparatus of the type used for processing an exposed film unit having opposed outside major surfaces together with a photosensitive layer and a processing composition adapted to be spread across the photosensitive layer wherein the photographic apparatus includes means for applying pressure to the exposed film unit and a housing configured to retain at least one of the exposed film units at a given position and to define an exit opening located forwardly of the pressure applying means through which the film unit may be advanced from the housing, said imbibing assembly comprising:
- a frame member releasably mounted to the photographic apparatus housing adjacent the path of travel of the exposed film unit as the exposed film unit moves through the exit opening in the housing; and
- means for at least protecting two opposed major photosensitive surfaces of the film unit from ambient light rays as the film unit emerges from the housing through the opening, said means including at least one opaque member mounted to said frame member in a predetermined stored arrangement, said arrangement being insensitive to changes in the orientation of said apparatus, said film protection means being structured and arranged to be automatically progressively extended from the housing to respectively overlie at least two major surfaces of the film unit as the film unit is advanced a predetermined distance out of the opening and to be automatically returned to the stored arrangement in response solely to the film unit being advanced from said film protecting means.

* * * * *

UNITED STATES PATENT AND TRADEMARK OFFICE
CERTIFICATE OF CORRECTION

PATENT NO. : 3,996,595
DATED : December 7, 1976
INVENTOR(S) : Andrew S. Ivester

It is certified that error appears in the above-identified patent and that said Letters Patent are hereby corrected as shown below:

Column 9, after line 17, insert the following

--said means including at least two opaque members mounted from said housing and structured and arranged to be automatically progressively extended from said housing to respectively overlie at least two major surfaces of the film unit as the film unit is advanced a predetermined distance outward of said opening--

Signed and Sealed this

Twenty-first Day of November 1978

[SEAL]

Attest:

RUTH C. MASON
Attesting Officer

DONALD W. BANNER
Commissioner of Patents and Trademarks